(12) United States Patent
Sashittal et al.

(10) Patent No.: US 9,201,812 B2
(45) Date of Patent: Dec. 1, 2015

(54) MULTIPLE LOGICAL REPRESENTATIONS OF AUDIO FUNCTIONS IN A WIRELESS AUDIO TRANSMITTER THAT TRANSMITS AUDIO DATA AT DIFFERENT DATA RATES

(75) Inventors: Nihar Satyendra Sashittal, Bangalore (IN); Himanshu Shukla, Sunnyvale, CA (US); Jeffery Miao, Saratoga, CA (US)

(73) Assignee: AliphCom, San Francisco, CA (US)

( * ) Notice: Subject to any disclaimer, the term of this patent is extended or adjusted under 35 U.S.C. 154(b) by 678 days.

(21) Appl. No.: 13/247,975

(22) Filed: Sep. 28, 2011

(65) Prior Publication Data

US 2013/0028301 A1 Jan. 31, 2013

Related U.S. Application Data (60) Provisional application No. 61/511,541, filed on Jul. 25, 2011.

(51) Int. Cl.
*G06F 13/00* (2006.01)
*G06F 13/38* (2006.01)
*G06F 3/16* (2006.01)

(52) U.S. Cl.
CPC .............. *G06F 13/00* (2013.01); *G06F 13/385* (2013.01); *G06F 3/165* (2013.01); *G06F 2213/3812* (2013.01); *G06F 2213/3814* (2013.01)

(58) Field of Classification Search
CPC ........... G06F 3/16; G06F 3/162; G06F 3/165; G06F 3/167; G06F 17/00; H04B 7/00; H04R 5/00; H04R 50/02
USPC ................. 700/94; 710/7, 100, 313; 370/310; 719/321, 322; 340/4.4; 381/311
See application file for complete search history.

(56) References Cited

U.S. PATENT DOCUMENTS 5,974,262 A 10/1999 Fuller et al.
D439,981 S 4/2001 Kasabach et al.
(Continued)

FOREIGN PATENT DOCUMENTS

CA 2413220 12/2001
CA 2441962 10/2002
(Continued)

OTHER PUBLICATIONS

U.S. Appl. No. 61/516,479, Fish et al.
(Continued)

*Primary Examiner* — Glenn A Auve
(74) *Attorney, Agent, or Firm* — Kokka & Backus, PC (57) ABSTRACT

Embodiments of the invention relate generally to electrical and electronic hardware, computer software, wired and wireless network communications, and computing devices. More specifically, the embodiments related to structures and techniques for implementing multiple logical representations of audio functions in a wireless audio transmitter, such as a USB dongle configured to transmit and to receive audio data wirelessly via, for example, a Bluetooth link. In one embodiment, a wireless USB audio transceiver can include a multiple mode transmitter configured transmit wireless signals at multiple data rates. Further, the wireless USB audio transceiver can include a first data path modeled as a first audio function, and a second data path modeled as a second audio function. Also, included is a signal detector configured to determine the presence of the audio data on a data path for modifying transmission data rates as a function of the presence of the audio data.

12 Claims, 8 Drawing Sheets

(56) References Cited

U.S. PATENT DOCUMENTS

| | | |
|---|---|---|
| D451,604 S | 12/2001 | Kasabach et al. |
| 6,356,940 B1 | 3/2002 | Short |
| D460,971 S | 7/2002 | Sica et al. |
| 6,486,801 B1 | 11/2002 | Jones |
| 6,527,711 B1 | 3/2003 | Stivoric et al. |
| 6,595,929 B2 | 7/2003 | Stivoric et al. |
| 6,605,038 B1 | 8/2003 | Teller et al. |
| 6,714,859 B2 | 3/2004 | Jones |
| 6,904,359 B2 | 6/2005 | Jones |
| 6,952,645 B1 | 10/2005 | Jones |
| 7,020,508 B2 | 3/2006 | Stivoric et al. |
| 7,030,781 B2 | 4/2006 | Jones |
| 7,153,262 B2 | 12/2006 | Stivoric et al. |
| 7,261,690 B2 | 8/2007 | Teller et al. |
| 7,285,090 B2 | 10/2007 | Stivoric et al. |
| 7,343,260 B1 | 3/2008 | Kahn et al. |
| 7,400,970 B2 | 7/2008 | Jones |
| 7,457,719 B1 | 11/2008 | Kahn et al. |
| 7,502,643 B2 | 3/2009 | Farringdon et al. |
| 7,609,840 B2 | 10/2009 | Boss et al. |
| 7,647,195 B1 | 1/2010 | Kahn et al. |
| 7,647,196 B2 | 1/2010 | Kahn et al. |
| 7,653,508 B1 | 1/2010 | Kahn et al. |
| 7,662,065 B1 | 2/2010 | Kahn et al. |
| 7,689,437 B1 | 3/2010 | Teller et al. |
| 7,690,556 B1 | 4/2010 | Kahn et al. |
| 7,705,723 B2 | 4/2010 | Kahn et al. |
| 7,747,735 B1 | 6/2010 | Kahn et al. |
| 7,753,861 B1 | 7/2010 | Kahn et al. |
| 7,788,059 B1 | 8/2010 | Kahn et al. |
| 7,800,044 B1 | 9/2010 | Kahn et al. |
| 7,839,279 B2 | 11/2010 | Kahn et al. |
| 7,841,967 B1 | 11/2010 | Kahn et al. |
| 7,849,184 B1 | 12/2010 | Kahn et al. |
| D631,552 S | 1/2011 | Kasabach et al. |
| D632,396 S | 2/2011 | Kasabach et al. |
| 7,881,902 B1 | 2/2011 | Kahn et al. |
| 7,907,901 B1 | 3/2011 | Kahn et al. |
| 7,917,768 B2 | 3/2011 | Kahn et al. |
| 7,959,567 B2 | 6/2011 | Stivoric et al. |
| 7,970,586 B1 | 6/2011 | Kahn et al. |
| 7,982,770 B1 | 7/2011 | Kahn et al. |
| 7,987,070 B2 | 7/2011 | Kahn et al. |
| 7,993,276 B2 | 8/2011 | Nazarian et al. |
| D645,968 S | 9/2011 | Kasabach et al. |
| 8,040,382 B2 | 10/2011 | Kahn et al. |
| 8,047,966 B2 | 11/2011 | Dorogusker et al. |
| 8,049,614 B2 | 11/2011 | Kahn et al. |
| 8,064,759 B1 | 11/2011 | Kahn et al. |
| 8,073,707 B2 | 12/2011 | Teller et al. |
| 8,083,643 B2 | 12/2011 | Ng et al. |
| 8,239,049 B2 * | 8/2012 | Koya et al. ............. 700/94 |
| 2004/0064324 A1 | 4/2004 | Graumann |
| 2006/0193273 A1 | 8/2006 | Passier et al. |
| 2008/0133227 A1 | 6/2008 | Kong et al. |
| 2008/0201658 A1 * | 8/2008 | Saito et al. ............. 715/772 |
| 2009/0016245 A1 * | 1/2009 | Karls ..................... 370/310 |
| 2009/0221234 A1 * | 9/2009 | Pirzada et al. ......... 455/41.2 |
| 2010/0158288 A1 | 6/2010 | Winter |
| 2012/0209413 A1 * | 8/2012 | Xu et al. ................. 700/94 |
| 2012/0224725 A1 * | 9/2012 | Prevot et al. ........... 381/123 |

FOREIGN PATENT DOCUMENTS

| | | |
|---|---|---|
| CA | 2496579 | 3/2004 |
| CA | 2560323 | 10/2005 |
| EP | 2001944698 | 6/2001 |
| EP | 2005732135 | 3/2005 |
| EP | 2009830687 | 11/2009 |
| IL | 153478 | 8/2009 |
| IL | 178183 | 12/2013 |
| JP | 200750091 | 2/2007 |
| WO | PCT/US01/40958 | 12/2001 |
| WO | PCT/US01/20014 | 1/2002 |
| WO | PCT/US02/09972 | 10/2002 |
| WO | PCT/US02/24552 | 2/2003 |
| WO | PCT/US03/26261 | 3/2004 |
| WO | PCT/US04/26187 | 2/2005 |
| WO | PCT/US05/09476 | 10/2005 |
| WO | PCT/US08/54312 | 8/2008 |
| WO | PCT/US09/06234 | 6/2010 |

OTHER PUBLICATIONS

U.S. Appl. No. 61/404,379, Fish et al.

* cited by examiner

MULTIPLE LOGICAL REPRESENTATIONS OF AUDIO FUNCTIONS IN A WIRELESS AUDIO TRANSMITTER THAT TRANSMITS AUDIO DATA AT DIFFERENT DATA RATES

CROSS-REFERENCE TO RELATED APPLICATIONS

This application is a U.S. Non-provisional Patent Application that claims the benefit of U.S. Provisional Patent Application No. 61/511,541, filed Jul. 25, 2011, and entitled "Multiple Logical Representations of Audio Functions in a Wireless Audio Transmitter that Transmits Audio Data at Different Data Rates," which is herein incorporated by reference for all purposes.

FIELD

Embodiments of the invention relate generally to electrical and electronic hardware, computer software, wired and wireless network communications, and computing devices. More specifically, the embodiments related to structures and techniques for implementing multiple logical representations of audio functions in a wireless audio transmitter, such as a USB dongle configured to transmit and to receive audio data wirelessly via, for example, a Bluetooth link.

BACKGROUND

Functionalities of computing devices have been enhanced with the implementation of supplemental communication devices, such as the wired implementation of Universal Serial Bus ("USB") for exchanging data between a host computing device and other devices, such as peripherals. USB dongles provide portable and/or temporary enhanced functionalities to a host computing device when coupled via a USB port to the host computing device. Wireless USB dongles provide a host computing device with a wireless communication link to peripherals. Further, USB dongles can provide different functions, such as storage and communications.

Conventionally, USB dongles are configured to model each function, such as storage and audio, as a unitary function. For example, traditional wireless USB dongles model all audio-related functionality as a single audio function, which is described as set forth in the Universal Serial Bus Device Class Definition for Audio Devices, Release 1.0, Mar. 18, 1998. Thus, most audio-related control and data signals are typically modeled in connection with an audio function, or as a single USB audio device.

While the conventional approach is functional, it is not well-suited for use across various proprietary computing platforms and operating systems. For example, some operating systems are designed to access multiple audio-related control and data functions simultaneously, which can produce unintended consequences or otherwise limit the use of a USB dongle. Further, conventional wireless USB communication dongles are not well-suited to adapt to usage of multiple audio and/or visual communication peripherals. Traditionally, wireless USB communication dongles are configured to communicate data at fixed frequencies so as not exceed bandwidth limitations of the wireless transmitter and receiver capabilities.

Thus, what is needed is a solution for wireless devices without the limitations of conventional techniques to manage data communications with communication devices and/or wireless peripheral, such as speakers.

BRIEF DESCRIPTION OF THE DRAWINGS

Various embodiments or examples ("examples") are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
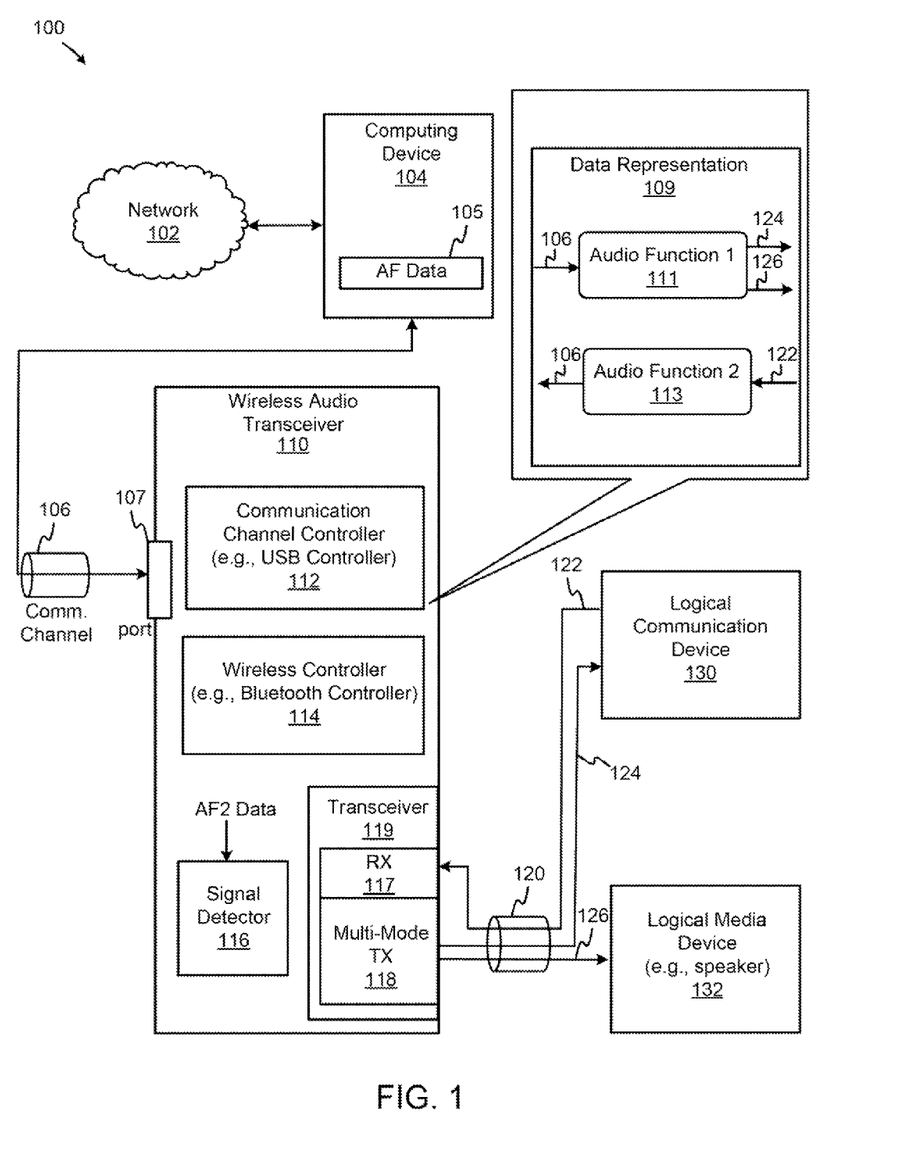
FIG. 1 is a diagram depicting a functional block diagram of a wireless audio transceiver, according to various embodiments.

FIG. 1 is a diagram 100 depicting a functional block diagram of a wireless audio transceiver, according to various embodiments. As shown, a wireless audio transceiver 110 includes a port 107, a communication channel controller 112, a wireless controller 114, a signal detector 116, and a transceiver 119, which is shown to include a wireless receiver ("RX") 117 and a wireless multiple-mode transmitter ("Multi-Mode TX") 118. While wireless audio transceiver 110 and its constituent components can be implemented in hardware or software, or a combination thereof, wireless audio transceiver 110 can be modeled such that sub-audio functions and/or individual audio-related control and data signals can be represented as different logical entities. A logical entity can be implemented as a data representation 109 (e.g., a data arrangement or structure). For example, FIG. 1 depicts that a first data path can be modeled by a first data representation or arrangement, whereby the first data arrangement constitutes an audio function ("1") 111. A second data path can be modeled by a second data representation or arrangement, whereby the second data arrangement constitutes another audio function ("2") 113. Audio function 111 represents a first data path for transmitting audio data from communication channel ("comm. channel") 106 to wireless links 124 and 125, with wireless links 124 and 125 being associated with one or more data rates. Audio function 113 represents a second data path for transmitting audio data from wireless link 122 to communication channel 106. Further, wireless audio transceiver 110 is configured to modify transmission rates of transceiver 119 based on activity associated with the first data path or the second data path. Signal detector 116 is configured to detect data activity on one or more data paths. For example, signal detector 116 can be configured to detect whether data (e.g., audio data for audio function 2, or AF2 data) is present or available to audio function 113 and/or is on the second data path. Depending on whether audio data is present or absent relative to audio function 113 and/or the second data path, multiple-mode transmitter 118 can transmit at different data rates, the transmission rate being a function of whether audio data is present or absent on the second data path. Multiple-mode transmitter 118 is configured to operate in at least two modes, a telephony mode in which voice data is being transmitted and received, and a non-telephony mode in which the bandwidth of the wireless links is available to stream sound data, such as music data, to speakers.

In view of the foregoing, wireless audio transceiver 110 can be modeled logically as two or more audio functions. Further, wireless audio transceiver 110 can modify its wireless transmission rates to provide sufficient amount of audio data via the wireless links as permitted by the bandwidth limitations of the wireless links. As to the former, modeling the first and second data paths as different audio functions can enhance the robustness, reliability and/or operability of wireless audio transceiver 110. For example, by modeling each of the data paths as separate logical entities, each data path can be accessed or controlled individually without affecting operation of the other audio functions (as other logical entities). Therefore, various operating systems can access one data path (as one logical entity) without disturbing another data path (or another logical entity), which might otherwise be the case if multiple data paths are modeled as part of a single logical entity. For example, some operating systems, such as Macintosh ("Mac") operating systems, may access different components of different data paths at the same time when multiple data paths are modeled as part of a single audio function. In this case, the presence or absence of data on one data path (e.g., the data path carrying microphone data) can be coupled to another data path (e.g., the data path carrying speaker data), thereby impeding the identification of activity on an individual data path for subsequently determining whether to modify transmission rates by multiple-mode transmitter 118. Thus, multiple logical entities and data representations of the data paths facilitate decoupling or isolating endpoints and buffers that otherwise might be coupled together. With enhanced, robust data integrity for the data paths in different audio function entities, wireless audio transceiver 110 can be configured to monitor the activity of at least one data path to determine whether to modify the transmission rates by multiple-mode transmitter 118 of another data path (or portion thereof). By changing the transmission rates of the wireless links, wireless audio transceiver 110 can optimize the delivery of sufficient amount of audio data to preserve or enhance the audio quality at, for example, a wireless headset or at a wireless speaker.

In operation, signal detector 116 is configured to detect whether a data signal (e.g., an audio signal) is present or absent on one of the data paths. For example, signal detector 116 monitors a second data path associated with audio function 113, where the audio data being transported can be microphone data. In cooperation with signal detector 116, multiple-mode transmitter 118 can dynamically and adaptively change the data rates with a logical communication device 130 and/or a logical media device 132, such as a speaker (or any other media device configured to consume audio or visual data), depending on the activity between logical communication device 130 and logical media device 132 and wireless audio transceiver 110. Logical communication device 130 can be any device, such as a headset or a mobile phone, that is configured to exchange data, such as telephony data, in a two-way manner such that it receives data from and transmits data to wireless audio transceiver 110, according to some embodiments. Further, logical communication device 130 can operate optionally as a media device when operating in a non-telephony mode (e.g., for receiving data as a one-way communication). For example, a headset operating with a disabled microphone can behave as a media device (e.g., speaker) operating to receive sound data, such as streaming music. Thus, the headset can operate in a non-telephony mode to receive audio data at a second data rate, and can operate in a telephony mode to receive audio data at a first data rate, with the second data rate being greater than the first data rate.

When there is no microphone data present on the second data path, signal detector 116 infers that wireless audio transceiver 110 is operating in a non-telephony mode. Note that signal detector 116 can be configured to determine whether wireless audio transceiver 110 is in a first mode or a second mode, according to some embodiments. For example, signal detector 116 can detect the presence of audio data on a second data path by determining whether a related buffer includes voice data. Or, signal detector 116 can detect the presence of audio data on a second data path by monitoring activity directly on the second data path. Also, signal detector 116 can detect the presence of audio data on a second data path by receiving a signal or a message (e.g., from host computing device 104) that such a condition exists. Signal detector 116 can determine whether to invoke changes in the transmission rates in response to a variety of conditions.

In the non-telephony mode, wireless audio transceiver 110 is not exchanging voice or other data over wireless links 122 and 124 with a logical communication device 130, which can be any communication device, such as a headset, that can communicate via wireless channel 120. Logical communication device 130 can be Bluetooth headset configured to use voice over IP ("VoIP") technologies to establish VoIP telephony calls originating from network 102, which can be the Internet. In response, multiple-mode transmitter 118 allocates the bandwidth of wireless channel 120 to wireless link 126, whereby relatively large (or sufficient) amount of data can be transmitted to a speaker 132 to produce higher quality of sound. Thus, the speaker data is uni-directional. By contrast, in the telephony mode, wireless audio transceiver 110 exchanges voice and other data over wireless links 122 and 124 with logical communication device 130. Signal detector 116 is configured to detect the presence of the voice data over the second data path, which includes wireless links 122 and 124, and is further configured to communicate the detected presence of voice data with multiple-mode transmitter 118. In response, multiple-mode transmitter 118 can modify the amount of audio transmitted to speaker 132 to ensure bandwidth of wireless channel 120 is shared among wireless links 122 and 124. Thus, the voice data is bi-directional. Speaker 132 can operate in a higher quality mode (e.g., when no voice data is present) or in a lower quality mode (e.g., when voice data is present). Receiver 117 can be configured to receive data, such as voice or microphone data, from a headset via wireless link 122.

In some cases, signal detector 116 can be configured to detect the presence of the voice data over the second data path during periods of time when sound data is absent on the first data path. In this case, voice data can be transmitted via wireless link 124 in higher quality and/or stereo, as bandwidth of wireless channel 120 can be devoted to logical communication device 130. But when sound data is again present on the first data path during active communications between wireless audio transceiver 110 and logical communication device 130, signal detector 116 can detect the presence of the sound data and invoke multiple-mode transmitter 118 to change the transmission rate along wireless link 124 from its relatively higher data rate to a lower data rate (e.g., from stereo voice data to monaural voice data) so as to accommodate sound data being transmitted via wireless link 126 to speaker 132.

Computing device 104, as a host computing device, can be any computing device with a processor and memory storing executable instructions. Computing device 104 can include an application, such as a media player, that is configured to receive audio data from network 102 (e.g., music data) and to stream that data via wireless audio transceiver 110 to speaker 132. Further, computing device 104 can include another application, such as a VoIP telephony application, such as Skype®, that is configured to exchange voice data from network 102 and to stream that data via wireless audio transceiver 110 to a headset, such as logical communication device 130. Computing device 104 can include any hardware or processor-based platform and any operating system, such as Windows XP®, Windows 7®, MAC OS®, etc., or any open source operating system, and the like. Computing device 104 can include device drivers and/or data, such as audio function ("AF") data 105, that is configured to operate with the multiple logical audio functions or audio devices of wireless audio transceiver 110. During enumeration, computing device 104 can use audio function data 105 to identify and implement multiple data arrangements of USB descriptors.

In some embodiments, wireless audio transceiver 110 can be represented by logical entities, whereby the functions of wireless audio transceiver 110 and its components can be modeled as objects or descriptors. In some embodiments, wireless audio transceiver 110 can include hardware, software, firmware, and any combination thereof. In some embodiments, communication channel controller 112 can be implemented as USB controller 112, which is configured to communicate with computing device 104 in accordance with communication protocols, such as USB protocols. A USB controller 112 can include circuitry to exchange USB signals (e.g., D+, D– signals) over a USB communication channel 106, circuitry to receive microphone data, including an analog-to-digital ("A/D") converter circuit, and circuitry to transmit sound data, including a digital-to-analog ("D/A") converter circuit. In some embodiments, a logical interface, such as an audio streaming interface ("ASI1"), can be associated with the A/D converter and a buffer, as an endpoint, to store microphone data, whereas, another logical interface, such as another audio streaming interface ("ASI2"), can be associated with the D/A converter and another buffer, as another endpoint, to store speaker data. According to various embodiments, there can be two or more data representations of the data paths as different audio functions. As such, other logical interfaces can be implemented in association with the communication channel over which USB signals (e.g., D+, D– signals) are transmitted. Therefore, a first audio control interface ("ACI1") and a second audio control interface ("ACI2") can be associated with, for example, a set of USB D+ and D– signals, for example.

In some embodiments, wireless controller 114 can be implemented as a Bluetooth® controller 114, which is configured to communicate with logical communication device 130 and speaker 132 in accordance with wireless communication protocols, such as Bluetooth protocols. Bluetooth controller 114 can include radio frequency ("RF") circuitry to generate and receive radio signals, circuitry to store, access and/or implement Bluetooth protocols, protocol stacks, and baseband communications, as well as digital signal processing ("DSP") circuitry, A/D and D/A converter circuitry, and the like. In a specific embodiment, Bluetooth controller 114 includes a radio configured to transmit audio data at various data rates. In one example, Bluetooth controller 114 can transmit data at 16 kHz and at 8 kHz. According to some embodiments, Bluetooth controller 114 can include transceiver 119. In operation, Bluetooth controller 114 can transmit voice data over wireless link 124 with 16-bits at 8 kHz in telephony mode, when speaker data is transmitted to speaker 132. Bluetooth controller 114 can transmit sound data over wireless link 126 with 16-bits at 16 kHz, 32 kHz, 44.1 kHz, or 48 kHz in non-telephony mode, when voice data is absent.

In some instances, "higher quality" sound data refers to sound data transmitted with 16-bits at 16 kHz (or equivalent), whereas "lower quality" sound data refers to sound data transmitted with 16-bits at 8 kHz (or equivalent). In various embodiments, "higher quality" sound data refers to data having a higher sample rate than "lower quality" sound data. Thus, a first data rate can be at 8 kHz, whereas a second data rate can be at 16 kHz in accordance with at least one embodiment. The term "data path" can describe a communications medium or channel over which data is transported anywhere from network 102 to logical communication device 130 or speaker 132, and can describe any of the portions thereof (e.g., the data path in wireless audio transceiver 170).

Figure 2A:
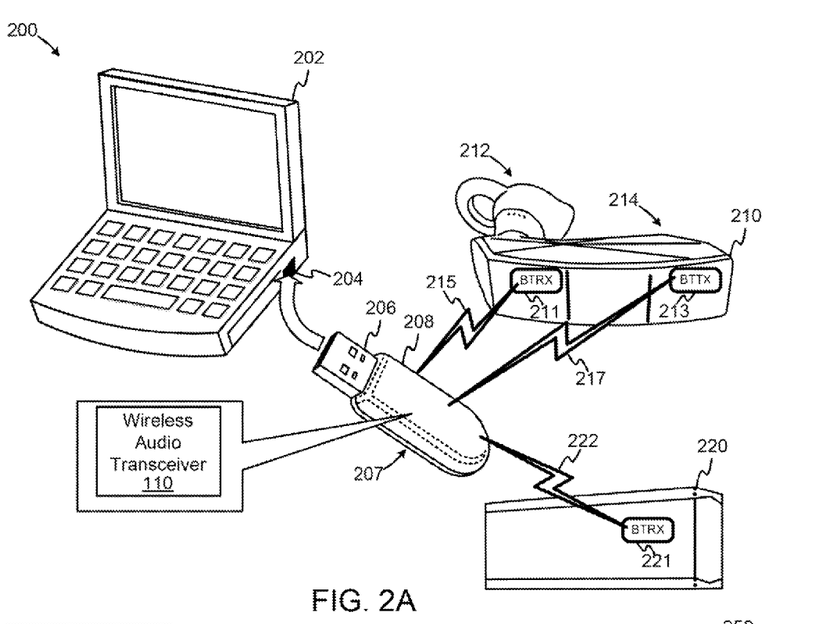
FIGS. 2A and 2B depict examples of various implementations of wireless audio transceivers, according to various embodiments.
Figure 2B:
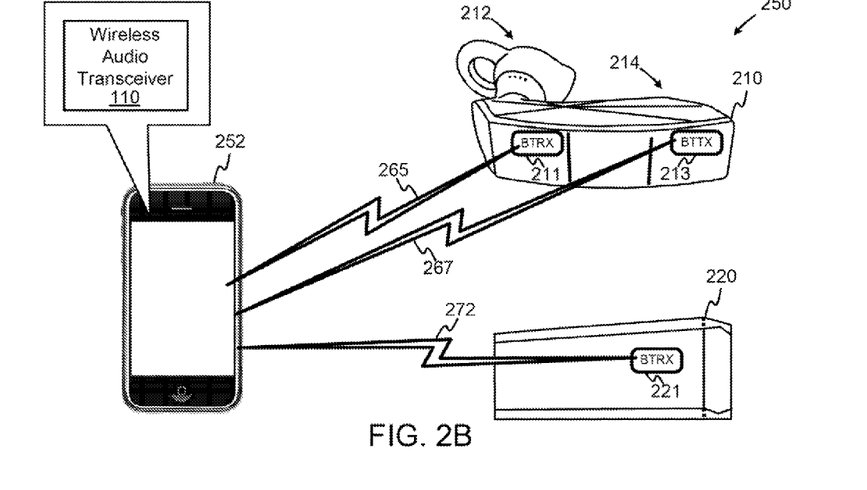

FIGS. 2A and 2B depict examples of various implementations of wireless audio transceivers, according to various embodiments. FIG. 2A is a diagram 200 of a wireless audio transceiver 110 implemented as a dongle 207, according to some embodiments. As shown, diagram 200 includes a laptop as host computing device 202 having a USB port 204. Dongle 207 includes a USB connector 206 and a housing 208. Also shown is a headset 210 that includes a speaker at portion 212 and a microphone at portion 214. Headset 210 includes a Bluetooth receiver module ("BTRX") 211 and a Bluetooth transmitter module ("BTTX") 213 to transmit microphone data. Speaker 220 includes a Bluetooth receiver module ("BTRX") 221. Dongle 207 is configured to transmit voice data via wireless link 215 to headset 210 and to transmit sound data via wireless link 222 to speaker 220. Dongle 207 is configured to receive voice data via wireless link 217 from headset 210. FIG. 2B is a diagram 250 of a wireless audio transceiver 110 formed within a mobile computing-communication device 252, according to some embodiments. As shown, diagram 250 includes mobile host computing device 252 including a wireless audio transceiver 110. Also shown is a headset 210 that includes a speaker at portion 212 and a microphone at portion 214. Headset 210 includes a Bluetooth receiver module ("BTRX") 211 and a Bluetooth transmitter module ("BTTX") 213 to transmit microphone data. Speaker 220 includes a Bluetooth receiver module ("BTRX") 221.

Wireless audio transceiver 110 of FIG. 2B is configured to transmit voice data via wireless link 265 to headset 210 and to transmit sound data via wireless link 272 to speaker 220. Wireless audio transceiver 110 of FIG. 2B is also configured to receive voice data via wireless link 267 from headset 210.

Figure 3A:
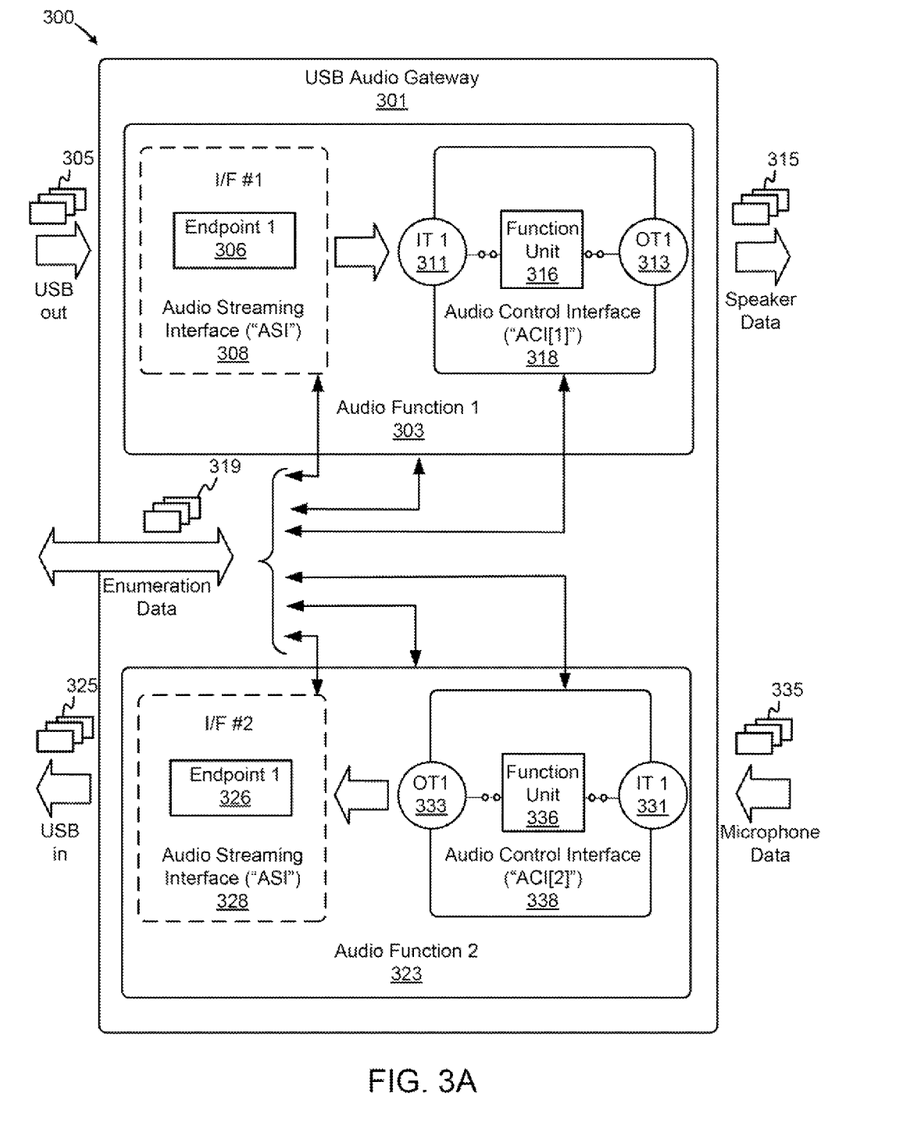
FIG. 3A illustrates an example of a topology of audio functions, according to an embodiment.

FIG. 3A illustrates an example of a topology of audio functions, according to an embodiment. In diagram 300, a USB audio gateway 301 is shown to include of multiple logical entities, such as audio function ("1") 303 and as audio function ("2") 323. In particular, a first data path is modeled to include audio function 303, which is configured to receive USB data 305 from a USB port (e.g., from the host computer) and to transmit speaker data 315. A second data path is modeled to include audio function 323, which is configured to receive microphone data 335 and to transmit that data via a USB port as USB data 325 (e.g., to the host computer).

As a logical entity, audio function 303 includes a first audio control interface ("ACI[1]") 318 having an input terminal ("IT 1") 311, a function unit 316, which is optional, and an output terminal ("OT 1") 313. Audio function 303 also includes an audio stream interface ("ASI") 308 with an endpoint ("1") 306 as a first interface ("I/F #1") of USB audio gateway 301. Audio stream interface 308 can be configured to stream audio data isochronously to a speaker (not shown). Audio function 303 is a data arrangement representing an independent part of a USB audio gateway 301 relating to the functionality of speaker data. Endpoint 306 is a buffer for receiving speaker data from the host computer when audio function 303 is active. Input terminal 311 can be coupled to USB endpoint 306 to receive the speaker data. Output terminal 313 can be coupled to a D/A converter (not shown). Function unit 316 can be any function or addressable logical object that can be used to access the transport of speaker data. As such, a signal detector (not shown) can access the second data path via function unit 316 to determine the presence or absent of speaker data. Or, in some embodiments, the signal detector can monitor the state of endpoint 306 as a buffer. When active, the signal detector can infer that speaker data is present on the second data path, otherwise the signal detector can infer that speaker data is absent when the buffer is inactive.

Similarly, audio function 323 is a logical entity that includes a second audio control interface ("ACI[2]") 338 having an input terminal ("IT 1") 331, a function unit 336, which is optional, and an output terminal ("OT 1") 333. Audio function 323 also includes an audio stream interface ("ASI") 328 with an endpoint ("1") 326 as a second interface ("I/F #2") of USB audio gateway 301. Audio stream interface 328 can be configured to stream audio data isochronously from a microphone (not shown). Audio function 323 is a data arrangement representing yet another independent part of a USB audio gateway 301 relating to the functionality of microphone data. Endpoint 326 is a buffer for receiving microphone data from a remote communication device (e.g., a remote logical communication device) when audio function 323 is active. Input terminal 331 can be coupled to an A/D converter (not shown) to receive microphone data. Output terminal 333 can be coupled to USB endpoint 326 to transmit the microphone data as USB data 325. Function unit 336 can be any function or other addressable logical object that can be used to access (e.g., manipulate) the transport of microphone data. As such, a signal detector (not shown) can access the first data path via function unit 336 to determine the presence or absent of microphone data. Or, in some embodiments, the signal detector can monitor the state of endpoint 326 as a buffer. When active, the signal detector can infer that microphone data is present on the first data path, otherwise the signal detector can infer that microphone data is absent when the buffer is inactive.

During enumeration, enumeration data 319 is transmitted to the host computing device. Enumeration data 319 describes the logical entities, which include first audio control interface 318, input terminal 311, function unit 316, output terminal 313, audio stream interface 308, and endpoint 306. These elements are associated with a first audio interface collection ("AIC"), which is not shown. Further, enumeration data 319 also describes the following logical entities: second audio control interface 338, input terminal 331, function unit 336, output terminal 333, audio stream interface 328, and endpoint 326. These elements are associated with a second audio interface collection ("AIC"), which is not shown. Therefore, the host computer logically can view USB audio gateway 310 (e.g., in a single housing) as multiple audio devices. Note that control endpoints are not shown for purposes of clarity, but can be implemented.

Figure 3B:
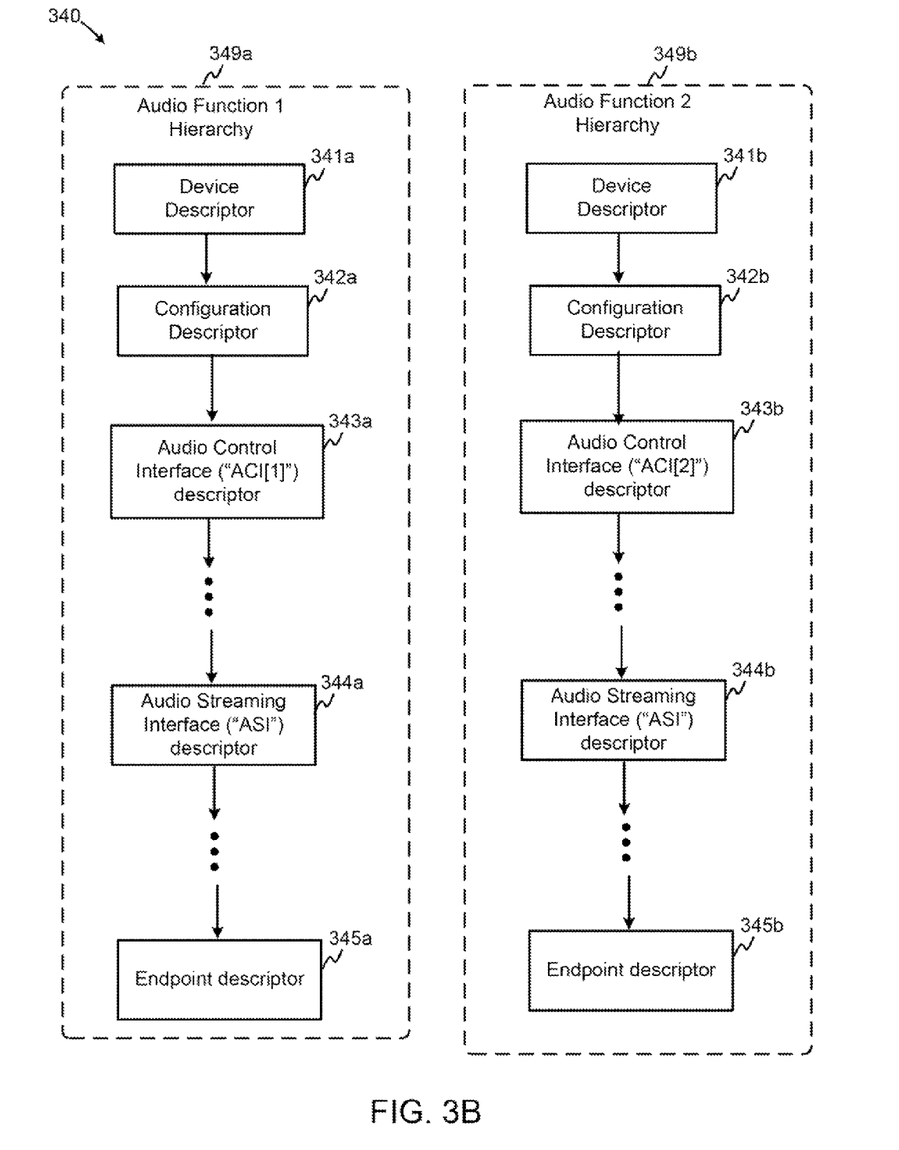
FIG. 3B illustrates an example of a descriptor hierarchy of a USB audio gateway, according to some embodiments.

FIG. 3B illustrates an example of a descriptor hierarchy of a USB audio gateway, according to some embodiments. In diagram 340, the USB audio gateway is shown to include multiple data arrangements, including a first data arrangement as audio function ("1") hierarchy 349a and a second data arrangement as audio function ("2") hierarchy 349b. Class-specific descriptors are omitted for purposes of clarity. A host computer uses audio function hierarchy 349a and audio function hierarchy 349b during enumeration. Device descriptor 341a is a data structure including data regarding USB audio gateway, including whether the device descriptor 341a represents an audio function and its interfaces. Configuration descriptor 342a is a data structure including data regarding the number of interfaces and other characteristics. Note that device descriptor 341b and configuration descriptor 342b can provide similar information, but for another data path or audio function. Note further that while audio function hierarchy 349a and audio function hierarchy 349b are illustrated as having separate device descriptors 341a and 341b and separate configuration descriptors 342a and 342b, audio function hierarchy 349a and audio function hierarchy 349b can share a common device descriptor and a common configuration descriptor (not shown), according to some embodiments, so long as a host computing device can detect the presence of multiple logical audio devices.

Audio function hierarchy 349a further includes a logical representation of an audio function (or portion thereof) as a data path to carry speaker data. Audio function hierarchy 349a includes an audio control interface ("ACI") descriptor 343a describing the number and types of terminals and function units, if any. Next, audio function hierarchy 349a includes an audio streaming interface ("ASI") descriptor 344a describing an audio stream using, for example, an isochronous endpoint to transfer audio data. Further, one or more alternate audio interface descriptors that can be used to determine alternate settings. For example a zero bandwidth alternate setting can be used and a non-zero bandwidth alternate setting can be used. As such, the alternate setting of an audio streaming interface remains at a zero bandwidth setting unless audio data is detected on the corresponding endpoint. Further, audio function hierarchy 349a includes an endpoint descriptor 345a to assign an isochronous endpoint to communicate speaker data along a first data path. Note that audio function hierarchy 349b similarly can include an audio control interface ("ACI") descriptor 343b, an audio streaming interface ("ASI") descriptor 344b (with alternative settings), and an endpoint descriptor 345b having similar functionalities as described above, but for purposes of facilitating audio streaming via a second data path for microphone data.

Figure 3C:
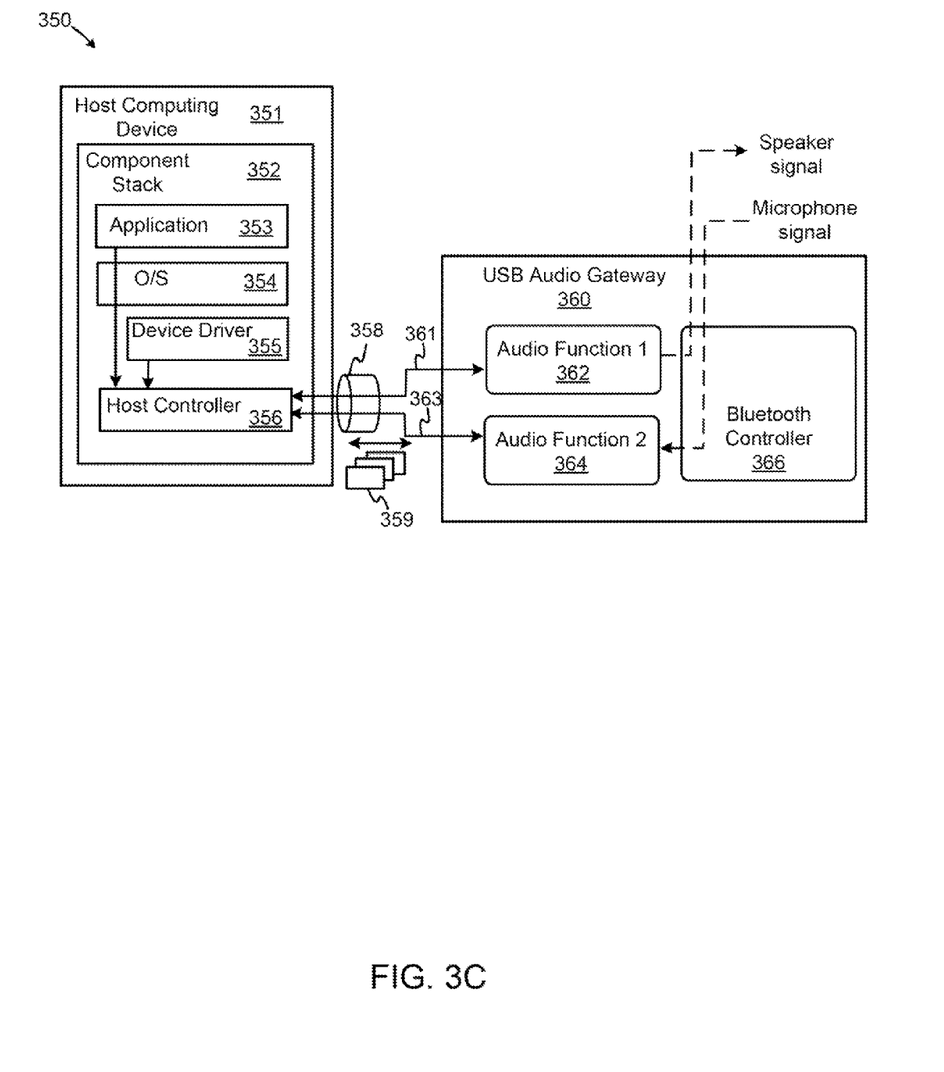
FIG. 3C illustrates an example of a host computer and a USB audio gateway during enumeration, according to some embodiments.

FIG. 3C illustrates an example of a host computer and a USB audio gateway during enumeration, according to some embodiments. Diagram 350 depicts a host computing device 351 including a component stack 352 coupled via a communication channel 358 to a USB audio gateway 360 to effect enumeration. Component stack 352 includes an application layer 353, an operating system ("O/S") layer 354, a device driver 355 and a host controller 356 (e.g., a USB host controller), whereas USB audio gateway 360 includes two logical representations of audio devices, such as audio function ("1") 362 and audio function ("2") 364, and a Bluetooth controller 366. During enumeration, host controller 356 interrogates USB audio gateway 360 to obtain enumeration data 359 and its descriptors indicating two data and control paths for two audio devices. Therefore, endpoints and buffers of audio function 362 and audio function 364 are isolated from each other (e.g., logically and/or physically isolated).

Figure 4:
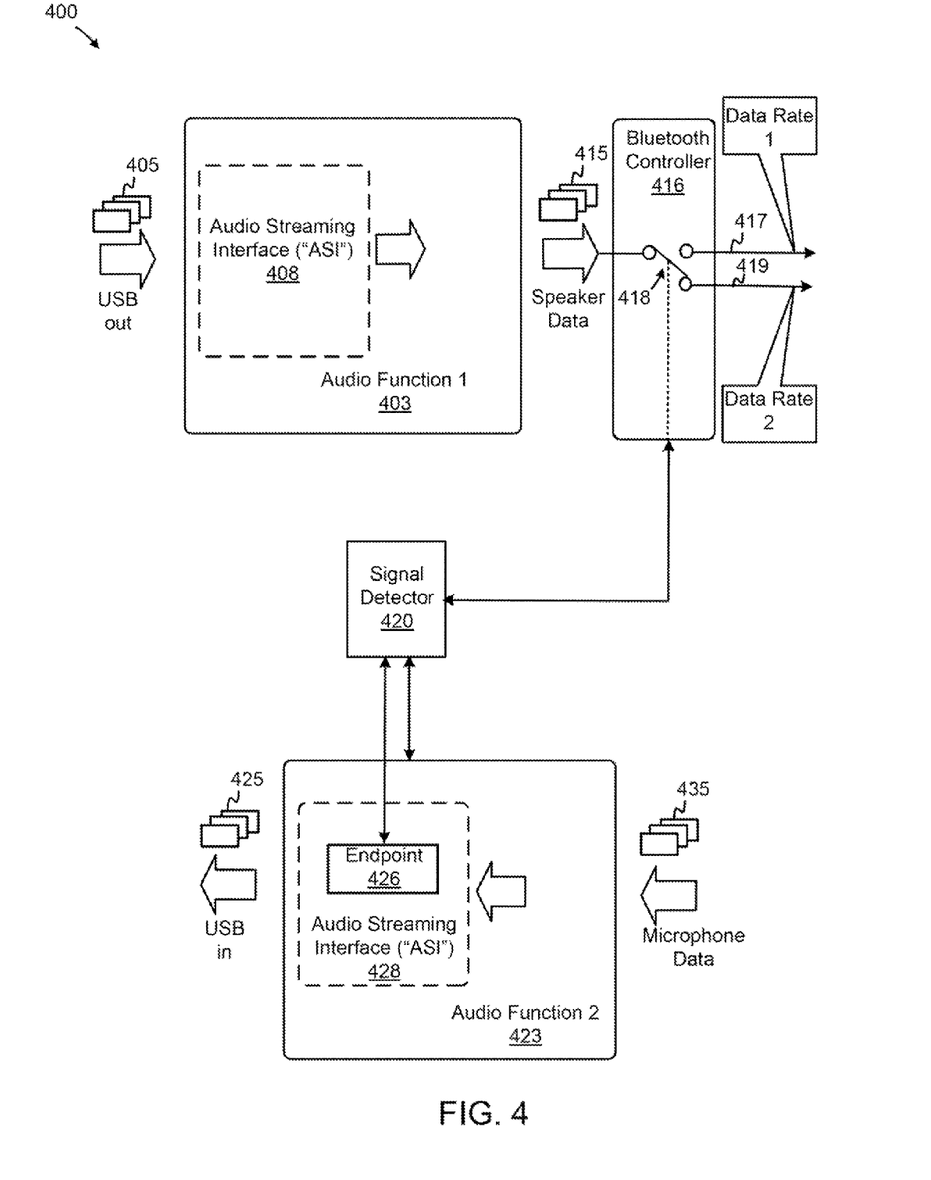
FIG. 4 illustrates an example of a signal detector operating in relation to logical representations of audio functions, according to some embodiments.

FIG. 4 illustrates an example of a signal detector operating in relation to logical representations of audio functions, according to some embodiments. Diagram 400 depicts an audio function 403 including an audio streaming interface 408 configured to receive speaker data as USB out data 405 and to transport speaker data 415 to a Bluetooth controller 416 for transmission at one or more data rates to a remote Bluetooth receiver (not shown). Further, diagram 400 depicts an audio function 423 including an audio streaming interface 428 configured to receive microphone data 435 into endpoint 426 for transport to the host computer as USB in data 425. Signal detector 420 is coupled between audio function 423 and either audio function 403 or Bluetooth controller 416, or both. In operation, signal detector 430 is configured to monitor the status or activity of data in a buffer associated with endpoint 426. If the buffer is inactive, signal detector 420 infers that no microphone data 435 is streaming via the second data path (e.g., the USB audio gateway is in a non-telephony mode). In this case, signal detector 420 transmits an indication signal or otherwise causes a software switch 418 to gate or transition speaker data onto a wireless link that is at a second data rate to consume the bandwidth of the Bluetooth link. But if signal detector 420 detects activity or data with respect to the buffer, then it infers that microphone data 435 is streaming via the second data path (e.g., the USB audio gateway is in a telephony mode). In this case, signal detector 420 transmits an indication signal or otherwise causes a software switch 418 to gate or transition speaker data onto a wireless link that is at a first data rate (e.g., less than the second data rate) to consume less than the entire bandwidth of the Bluetooth link so that both speaker and voice data can be transmitted out from Bluetooth controller.

Figure 5:
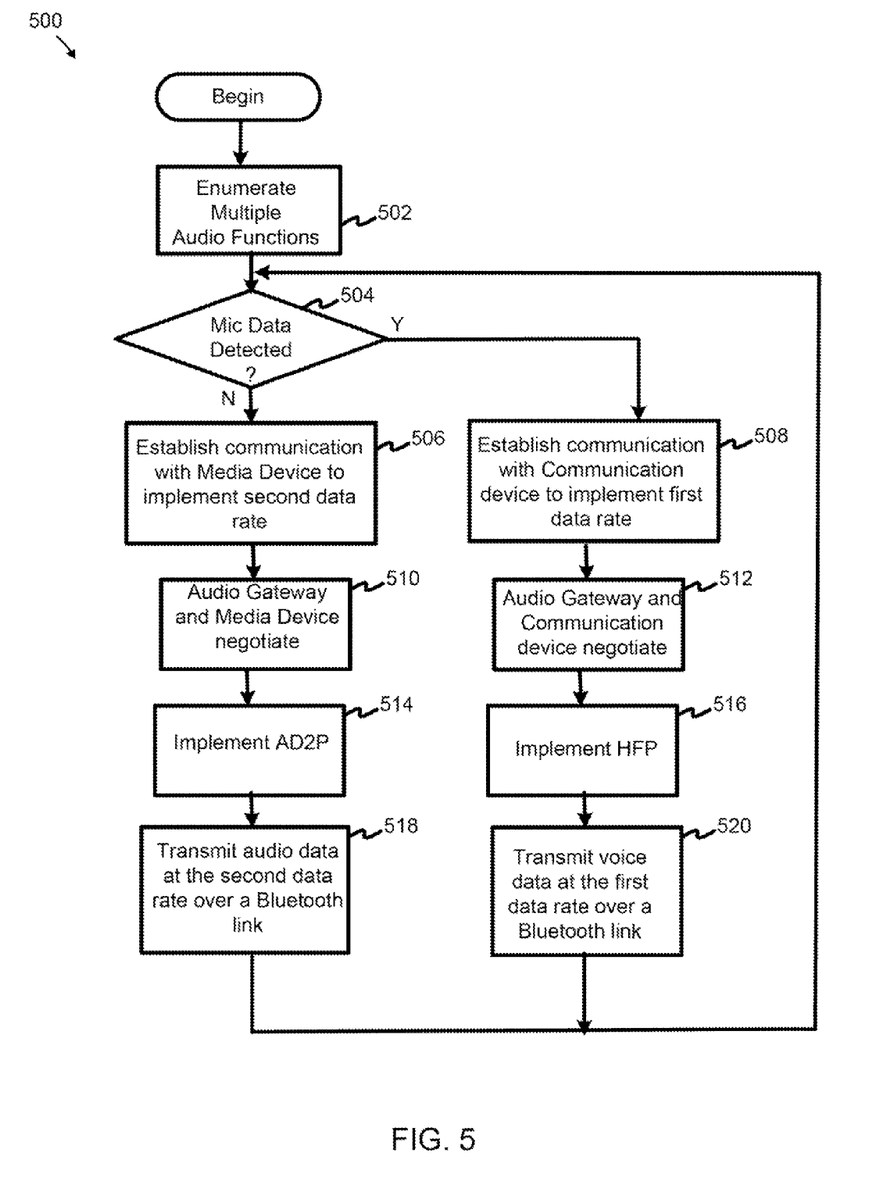
FIG. 5 illustrates an example of a flow for implementing multiple logical representations of audio functions to modify the data rate of wireless transmissions, according to some embodiments.

FIG. 5 illustrates an example of a flow for implementing multiple logical representations of audio functions to modify the data rate of wireless transmissions, according to some embodiments. FIG. 5 depicts a flow 500 in which enumeration occurs at 502. During enumeration, a USB audio gateway transmits to a host computing device identifiers or data representations of multiple audio functions associated with the USB audio gateway. The host computing device, and its device drivers, interacts with the USB audio gateway as if the USB audio gateway were multiple audio devices. At 504, the USB audio gateway determines whether microphone ("mic") data is detected. If no microphone data is detected, then flow 500 continues to 506 at which a second data rate is established (if not already established) to transmit audio data, such as sound or speaker data, to a remote media device (e.g., a remote logical media device). At 510, the USB audio gateway and logical media device negotiate a wireless connection at the second data rate and exchange information. Once a link is established at the second data rate, the USB audio gateway at 514 selects a Bluetooth profile, such as Advanced Audio Distribution Profile ("A2DP"), via Asynchronous Connectionless Links (i.e., ACL channels) implemented in Bluetooth and in accordance with Bluetooth profiles and protocols. Examples of such profiles and protocols are set forth in standards controlled by the Bluetooth Special Interest Group ("SIG"). The USB audio gateway then transmits speaker data at 518 at a second data rate over the Bluetooth link.

Should the USB audio gateway determine at 504 that microphone ("mic") data is detected, then flow 500 continues to 508 at which a first data rate is established (if not already established) to transmit audio data, such as voice data, to a remote logical communication device, such as a headset. At 512, the USB audio gateway and logical media device negotiate a wireless connection at the first data rate and exchange information. Once a link is established at the first data rate, the USB audio gateway at 516 selects a Bluetooth profile, such as a Hands Free Profile ("HFP"), via Synchronous Connection-Oriented ("SCO") link implemented in Bluetooth and in accordance with Bluetooth profiles and protocols. The USB audio gateway then transmits voice data at 520 at a first data rate over the Bluetooth link.

Figure 6:
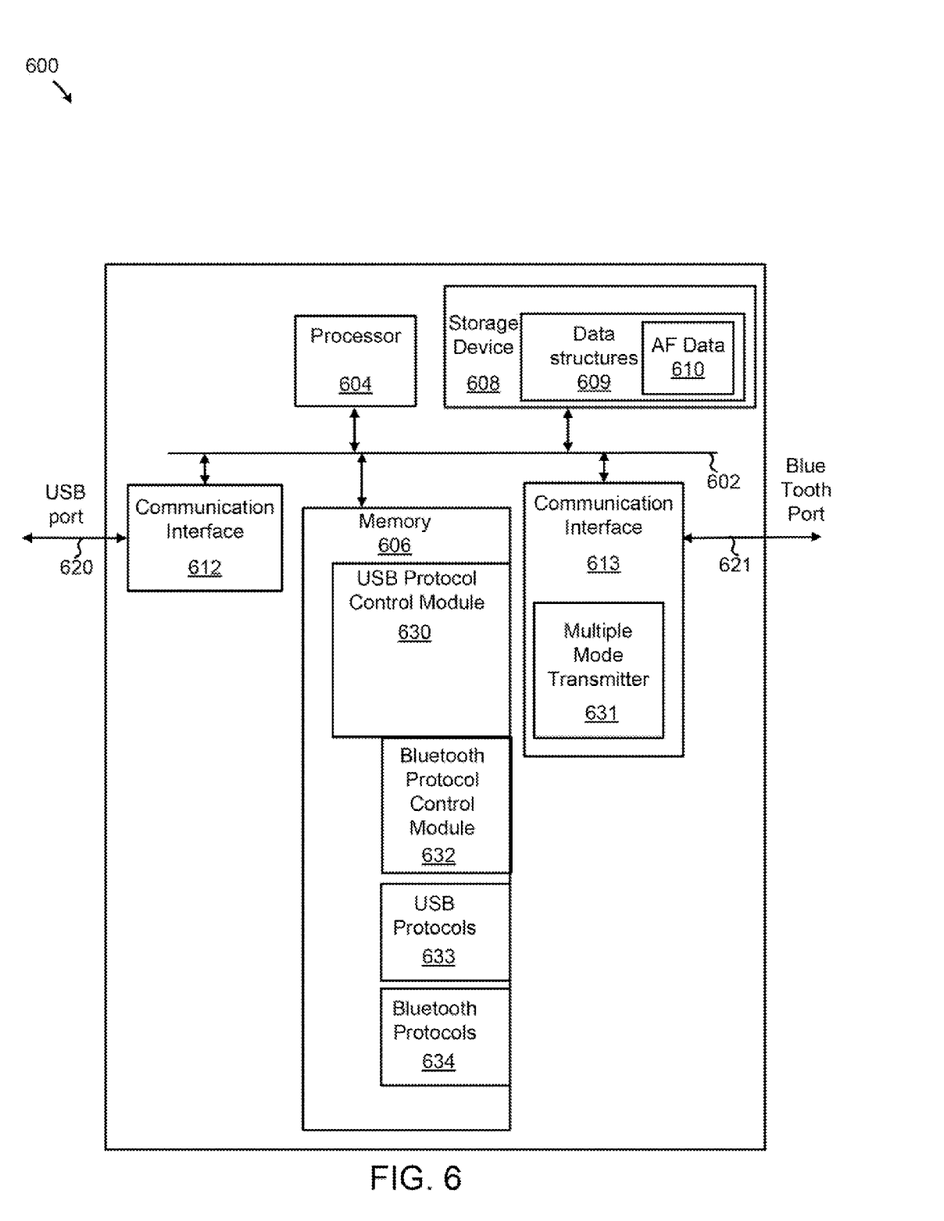
FIG. 6 illustrates an exemplary USB audio gateway in accordance with various embodiments.

FIG. 6 illustrates an exemplary USB audio gateway in accordance with various embodiments. In some examples, USB audio gateway 600 may be used to implement computer programs, applications, methods, processes, or other software to perform the above-described techniques. USB audio gateway 600 includes a bus 602 or other communication mechanism for communicating information, which interconnects subsystems and devices, such as processor 604, system memory 606 (e.g., RAM), storage device 608 (e.g., ROM), a first communication interface 612 (e.g., a USB controller) to facilitate USB communications via a USB port on communication channel 620, and a second communication interface 613 (e.g., a Bluetooth controller) to facilitate wireless communications on Bluetooth link 621. Bluetooth controller can include logic for implementing a multiple-mode transmitter 631.

According to some examples, USB audio gateway 600 performs specific operations by processor 604 executing one or more sequences of one or more instructions stored in system memory 606. Such instructions or data may be read into system memory 606 from another computer readable medium, such as storage device 608. In some examples, hard-wired circuitry may be used in place of or in combination with software instructions for implementation. Instructions may be embedded in software or firmware. The term "computer readable medium" refers to any tangible medium that participates in providing instructions to processor 604 for execution. Such a medium may take many forms, including but not limited to, non-volatile media and volatile media. Non-volatile media includes, for example, optical or magnetic disks and the like. Volatile media includes dynamic memory, such as system memory 606.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 602 for transmitting a computer data signal.

In some examples, execution of the sequences of instructions may be performed by a single USB audio gateway 600. According to some examples, USB audio gateways 600 can be coupled by communication link 620 (e.g., LAN, PSTN, or wireless network) to another processor to perform the sequence of instructions in coordination with one another. USB audio gateway 600 may transmit and receive messages, data, and instructions, including program, i.e., application code, through communication links 620 and 621 and communication interfaces 612 and 613. Received program code may be executed by processor 604 as it is received, and/or stored in memory 606, or other non-volatile storage for later execution.

In the example shown, system memory 606 can include various modules that include executable instructions to implement functionalities described herein. In the example shown, system memory 606 includes a USB Protocol Control module 630 to provide USB communications with a host computing device. According to some embodiments, system memory 606 can also include a Bluetooth Protocol Control module 632 to provide wireless communications with remote devices. Also, memory 606 can include data representing USB protocols 633 and Bluetooth protocols and profiles 634, as are described herein. Storage device 608, which can be the same or different memory as memory 606, can include data structures 609, such as descriptor data arrangements with audio function ("AF") data 610.

In at least some examples, the structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. These can be varied and are not limited to the examples or descriptions provided.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A wireless USB audio transceiver comprising:
    a port configured to exchange data via a USB communication channel with a host computing device;
    a wireless transceiver configured to receive and transmit wireless signals, the wireless transceiver comprising:
        a multiple mode transmitter configured transmit the wireless signals at multiple data rates;
        a first data path associated with a first audio function, the first data path configured to transmit audio data transmitted from the port to the wireless transceiver;
        a second data path associated with a second audio function, the second data path configured to transmit audio data transmitted from the wireless transceiver to the port, the first audio function and the second audio function being independently controlled via a first control interface and a second control interface, respectively; and
        an audio signal detector configured to determine the presence of the audio data on at least one of the first and the second data paths, the audio signal detector also being configured to monitor data activity in a buffer associated with an endpoint in data communication with the first data path or the second data path, wherein the data activity is configured to indicate whether microphone data is streaming via the second data path,
    wherein the multiple mode transmitter is configured to transmit the audio data at one of the multiple data rates as a function of the presence of the audio data on one or both of the first and the second data paths.

2. The USB wireless audio transceiver of claim 1, wherein USB wireless audio transceiver further comprises:
    a dongle including the port as a USB port and a housing.

3. The USB wireless audio transceiver of claim 1, further comprising:
    a memory comprising:
        a first hierarchical data arrangement for the first audio function, the first hierarchical data arrangement including data representing the first control interface, a first audio streaming interface, and a first endpoint; and
        a second hierarchical data arrangement for the second audio function, the second hierarchical data arrangement including data representing the second control interface, a second audio streaming interface, and a second endpoint.

4. The USB wireless audio transceiver of claim 3, wherein the first hierarchical data and the second hierarchical data are configured to provide data to the host computing device to enumerate the first audio function and the second audio function as different audio devices.

5. The USB wireless audio transceiver of claim 1, wherein the multiple mode transmitter is configured further to maintain a bandwidth of the wireless signals below a maximum value when the wireless transceiver communicates the audio data on the first data path and the second data path.

6. The USB wireless audio transceiver of claim 1, wherein the multiple mode transmitter is configured further to transmit the audio data on the first data path at a first data rate when the audio data on the second data path is present.

7. The USB wireless audio transceiver of claim 6, wherein the multiple mode transmitter is configured further to transmit the audio data on the first data path at a second data rate when the audio data on the second data path is absent, the second data rate being greater than the first data rate.

8. A method comprising:
    receiving a request from a host computing device via a USB communications channel for descriptor data;
    transmitting descriptors representing multiple subsets of hierarchical data arrangements in response to the request to facilitate enumeration, a first subset of the hierarchical data arrangements including data for a first audio function and a second subset of the hierarchical data arrangements including data for a second audio function;
    detecting sound data at a first endpoint of the first audio function;

receiving a control signal into the first audio function to transport the sound data to a speaker;

determining voice data at a second endpoint of the second audio function is absent during a first time interval by monitoring data activity in a buffer associated with the second endpoint, wherein the data activity is configured to indicate whether voice data streaming via the second data path; and transmitting the sound data at a second data rate.

9. The method of claim 8, further comprising:

determining that the voice data at the second endpoint of the second audio function is present during a second time interval;

modifying the transmission rate of the sound data; and transmitting the sound data at a first data rate, the first data rate being less than the second data rate.

10. The method of claim 9, wherein transmitting the sound data at the first data rate and the second data rate comprises:

transmitting the sound data with a first amount of data to implement higher quality stereo; and transmitting the sound data with a second amount of data to implement lower quality stereo, respectively, wherein the second amount is less than the first amount.

11. The method of claim 8, wherein transmitting the descriptors comprises:

transmitting the descriptors from a dongle via the USB communication channel, whereby the host computing device detects that the dongle includes a first data representation for a first audio device and a second data representation for a second audio device.

12. The method of claim 8, wherein transmitting the descriptors comprises:

identifying a first audio control interface ("ACI") descriptor for transporting speaker data as the sound data via a first data path; and identifying a second audio control interface ("ACI") descriptor for transporting microphone data as the voice data via a second data path.

\* \* \* \* \*